(12) United States Patent
Wu

(10) Patent No.: US 12,310,343 B1
(45) Date of Patent: May 27, 2025

(54) PET WATER FEEDER

(71) Applicant: Shenzhen Jundian Technology Co., Ltd., Shenzhen (CN)

(72) Inventor: Shaobing Wu, Shenzhen (CN)

( * ) Notice: Subject to any disclaimer, the term of this patent is extended or adjusted under 35 U.S.C. 154(b) by 0 days.

(21) Appl. No.: 18/964,357

(22) Filed: Nov. 30, 2024

(51) Int. Cl.
*A01K 7/02* (2006.01)

(52) U.S. Cl.
CPC ..................... *A01K 7/02* (2013.01)

(58) Field of Classification Search
CPC . A01K 7/00; A01K 7/02; A01K 7/025; A01K 9/00; A01K 9/005
See application file for complete search history.

(56) References Cited

U.S. PATENT DOCUMENTS

| | | | | |
|---|---|---|---|---|
| 4,895,109 A | * | 1/1990 | De Groot | A01K 9/00 119/51.5 |
| 6,792,891 B1 | * | 9/2004 | Coburn | A01K 39/0206 119/72 |
| 10,165,753 B1 | * | 1/2019 | Huang | A01K 7/02 |
| 2015/0282453 A1 | * | 10/2015 | Rogers | A01K 7/06 119/72 |
| 2016/0309680 A1 | * | 10/2016 | Blohm | A01K 39/014 |
| 2019/0075755 A1 | * | 3/2019 | Imaizumi | A01K 39/02 |
| 2020/0337266 A1 | * | 10/2020 | Yu | F16K 5/00 |
| 2021/0345582 A1 | * | 11/2021 | Yoo | G01C 9/02 |

OTHER PUBLICATIONS

U.S. Appl. No. 17/030,417, filed Mar. 11, 2021, Gong; Yuan Zhao; Kang.

* cited by examiner

*Primary Examiner* — Kristen C Hayes
(74) *Attorney, Agent, or Firm* — Nitin Kaushik

(57) ABSTRACT

Disclosed is a pet water feeder, which relates to the technical field of water feeders and includes a housing having an access opening and a bottom part for storing water; a crawling tray arranged in the housing and capable of draining water off; a water-weeping tray arranged in the housing and above the crawling tray, the water-weeping tray having a water-weeping hole; a water-dripping member installed in the water-weeping hole; a water pump located at the bottom part of the housing and including a water inlet and a water outlet, the water inlet being located at the bottom part of the housing, and the water outlet being connected with a water delivery pipe; and the water delivery pipe including a water outlet located above the water-weeping tray.

4 Claims, 5 Drawing Sheets

PET WATER FEEDER

TECHNICAL FIELD

The present application relates to the field of water feeders, in particular to a pet water feeder.

BACKGROUND

The group which feeds reptiles as pets becomes bigger and bigger, and the lizards are widely fed. At current the reptile pets, such as the lizards, food and water should be provided to feed them. Dedicated live small animals are mostly taken as foods of the pets to meet the health requirement of the pets. But regarding water drinking of pets, at current the common way is to fill a basin with water and take the basin to feed water. This way of feeding water is relatively backward, and it is difficult to meet the demand of water feeding.

SUMMARY

The pet water feeder provided by an embodiment of the present application includes:
- a housing having an access opening and a bottom part for storing water;
- a crawling tray arranged in the housing and capable of draining water off;
- a water-weeping tray arranged in the housing and above the crawling tray, the water-weeping tray having a water-weeping hole;
- a water-dripping member installed in the water-weeping hole;
- a water pump located at the bottom part of the housing and including a water inlet and a water outlet, the water inlet being located at the bottom part of the housing, and the water outlet being connected with a water delivery pipe; and
- the water delivery pipe including a water outlet located above the water-weeping tray.

In an embodiment, an upper end of the housing is provided with a mounting groove for accommodating a basket, the basket is located above the water-weeping tray, a storage frame is placed in the basket for accommodating active carbon.

In an embodiment, a lateral part of the basket is provided with clamping grooves, and an outer surface of the storage frame is provided with suspension tongues matched with the clamping grooves.

In an embodiment, an upper surface of the crawling tray is provided with a filtering layer.

In an embodiment, a water outlet of the water delivery pipe is provided with a flaring end cover.

The water feeder can provide an environment like a rainforest for the reptile pets such as the lizards, which is helpful for the better feeding of the lizards and the like. Furthermore, through the water pump 4, the circulating drinking water can be provided for the lizards, the water can be prevented from going bad and stinking resulted from long-time non-flowing. The drinking water is filtered through the active carbon and the filtering layer, the quality of the drinking water is improved, which is helpful for the long-term feeding of the reptile pets such as lizards.

DETAILED DESCRIPTION OF THE EMBODIMENTS

Figure 1:
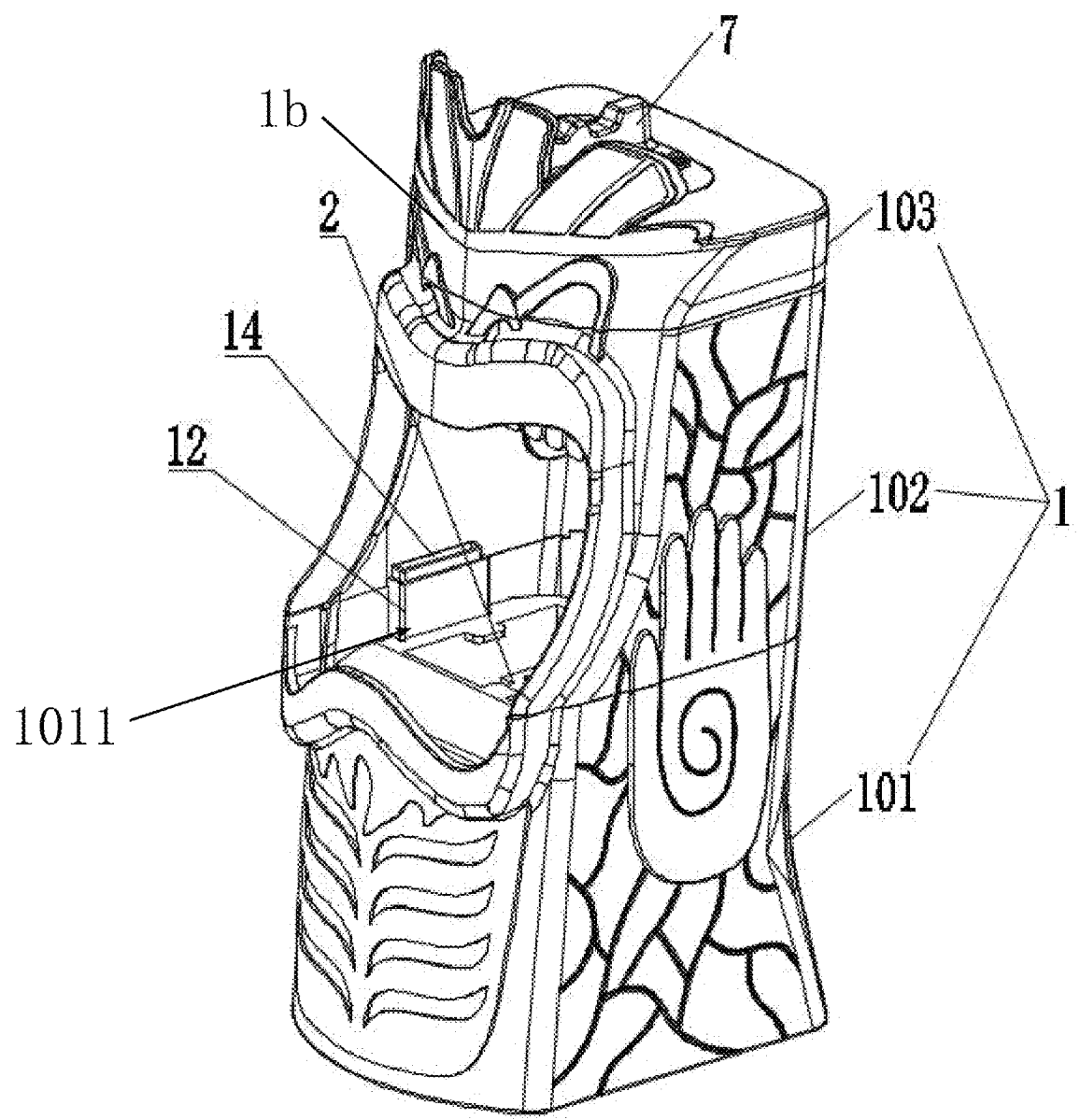
FIG. 1 is a schematic structural view of a pet water feeder according to an embodiment of the present application.

The following describes the embodiments of the present application in detail with reference to the figures.

As shown in FIGS. 1-5, a pet water feeder includes a house 1 having an access opening 1011. A crawling tray 2 which can drain water off is arranged in the housing 1. A water-weeping tray 6 is arranged above the crawling tray 2 in the housing 1. A water-weeping hole 61 is provided on the water-weeping tray 6, and a water-dripping member 3 is arranged in the water-weeping hole 61. A bottom part of the housing 1 is for storing water. A water pump 4 is arranged at the bottom part of the housing 1. A water inlet 41 of the water pump 4 is located at the bottom part 1a of the housing 1, and a water outlet 43 of the water pump 4 is connected with a water delivery pipe 5. A water outlet 51 of the water delivery pipe 5 is located above the water-weeping tray 6.

Figure 2:
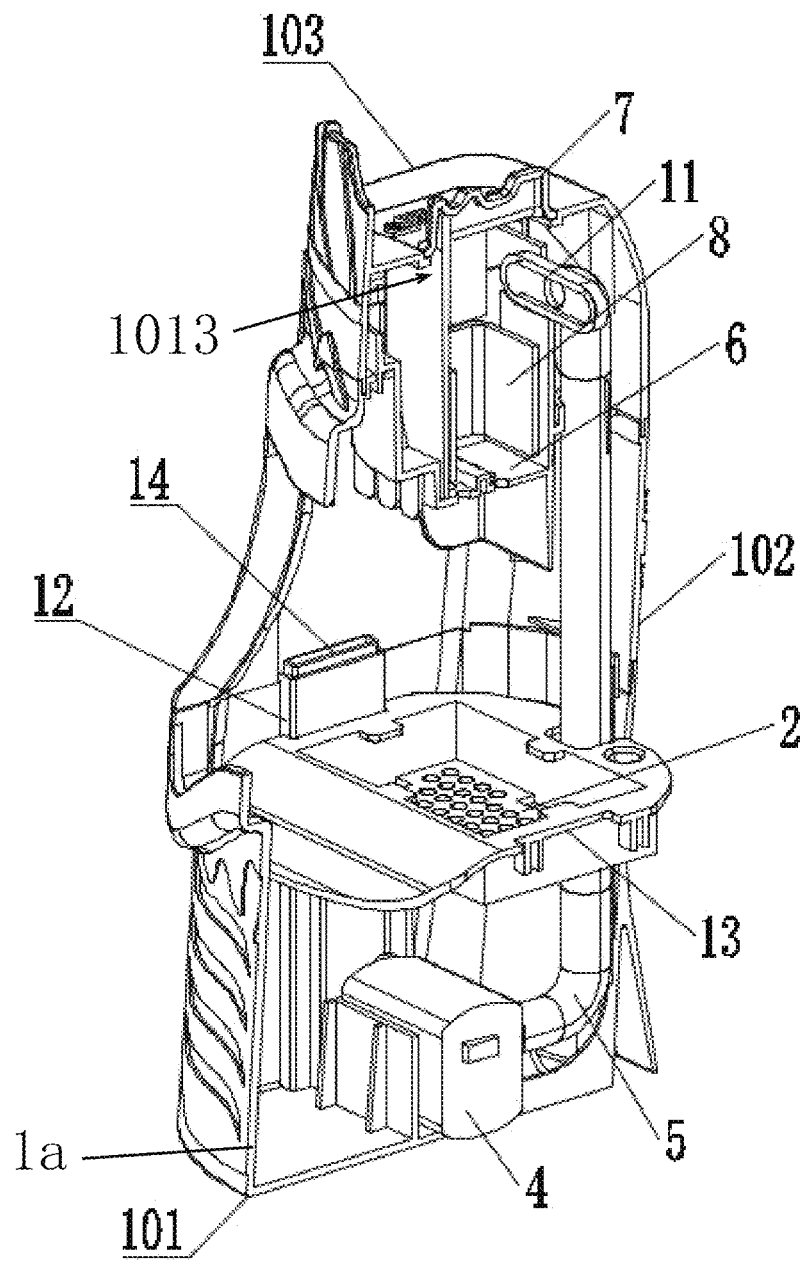
FIG. 2 is a schematic structural view of the pet water feeder according to an embodiment of the present application.
Figure 3:
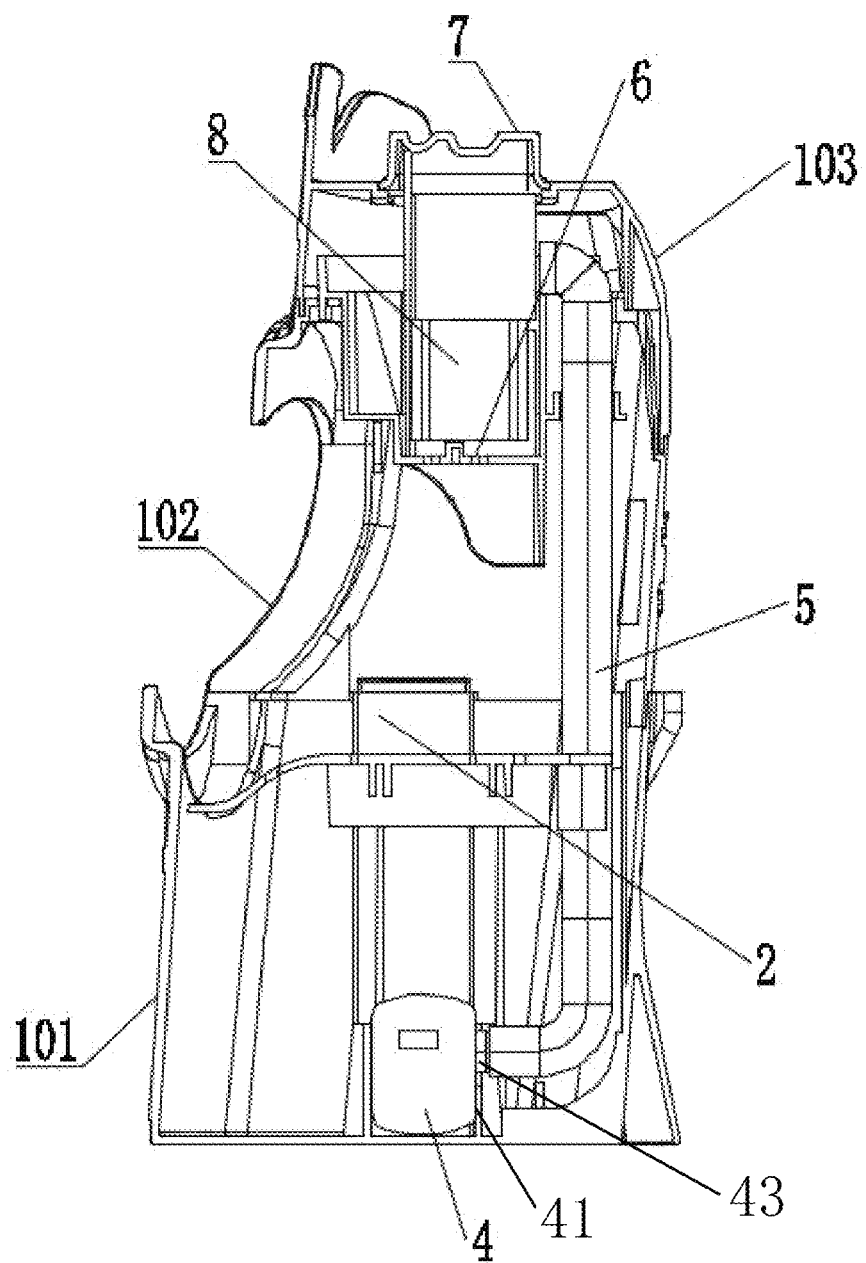
FIG. 3 is a schematic structural view of the pet water feeder according to an embodiment of the present application.
Figure 4:
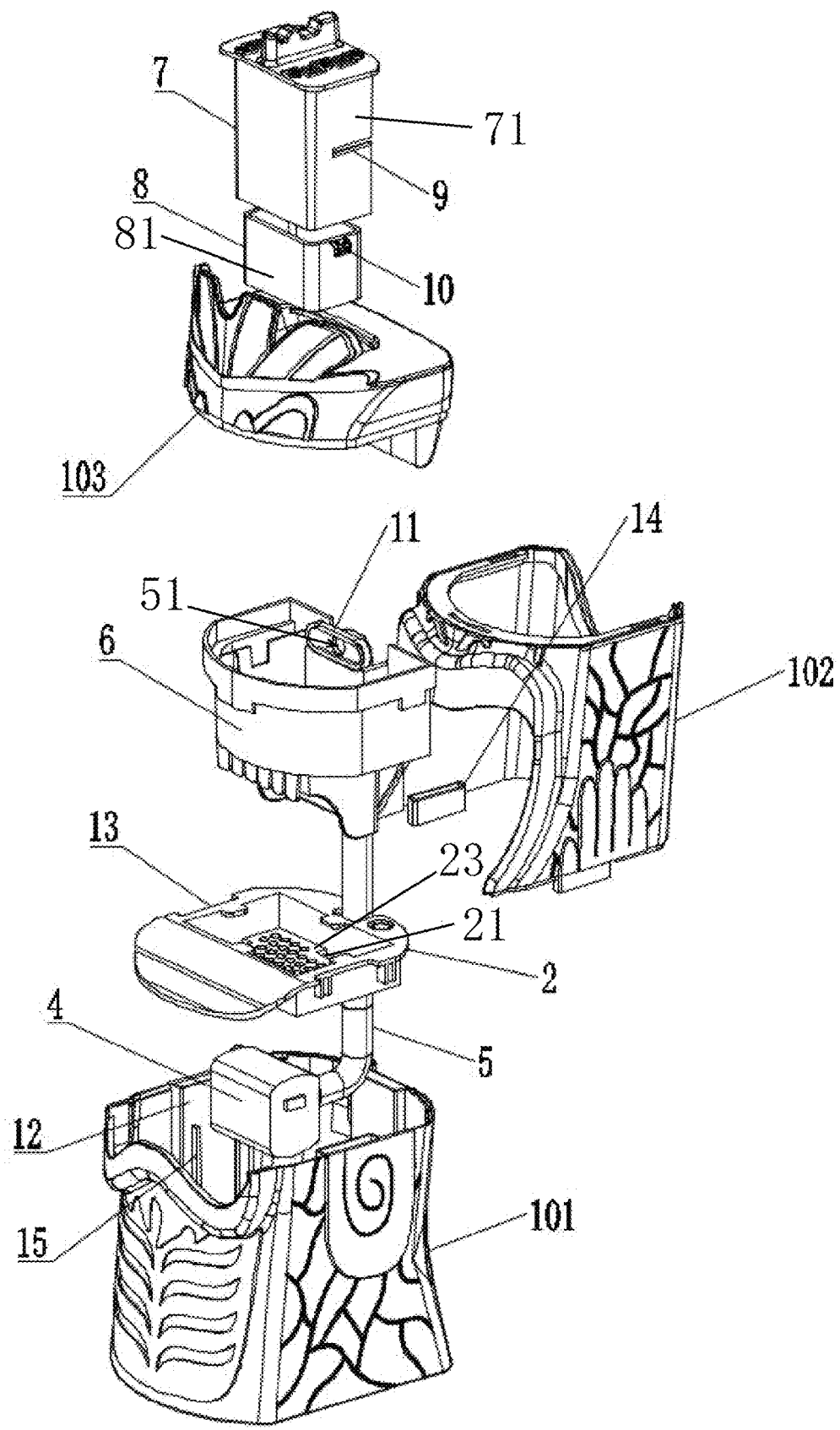
FIG. 4 is a schematic structural view of the pet water feeder according to an embodiment of the present application.
Figure 5:
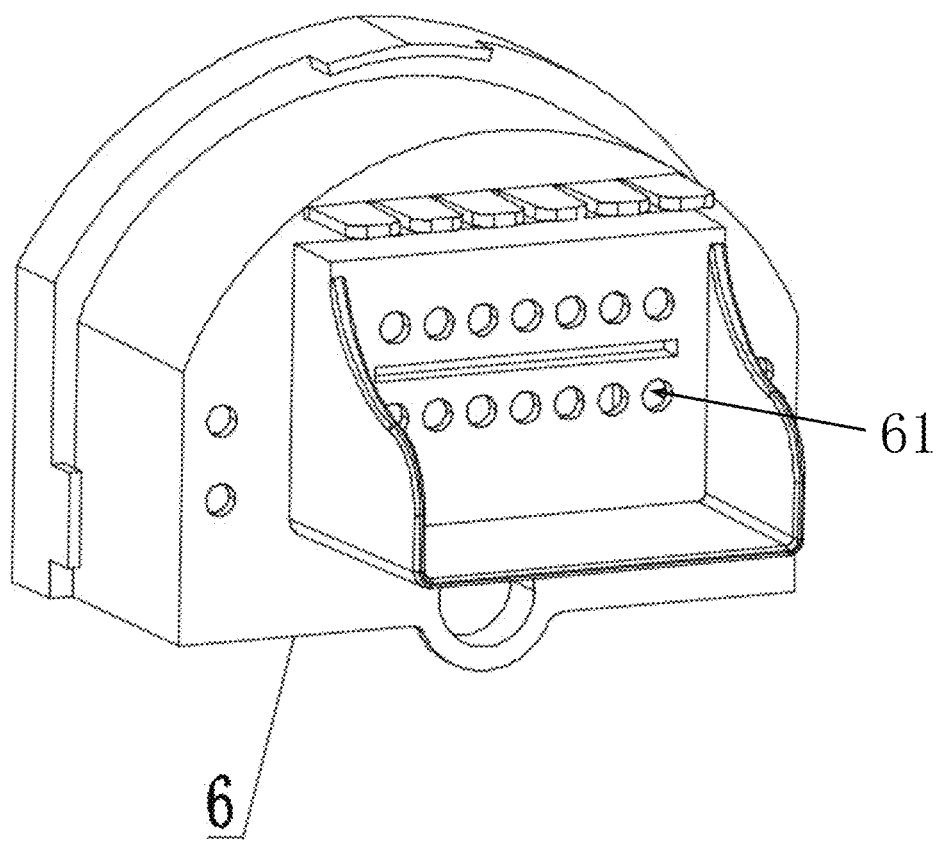
FIG. 5 is a schematic structural view of the pet water feeder according to an embodiment of the present application.

As shown in FIGS. 2, 3 and 4, the housing 1 includes a base 101, a connecting part 102 and a top cover 103. The base 101, the connecting part 102 and the top cover 103 are all injection molded, A cavity, which is configured for storing water, is defined in the base 101. The water pump 4 is located at the bottom part 1a of the base 101. A limiting plate is provided at the bottom part 10 of the base 101 to fix and limit the water pump 4, positioning plates 12 are provided at an inner side wall of the base 101 and symmetrical to each other. Each of two ends of the crawling tray 2 is provided with a positioning groove 13 matched with a corresponding one of limiting plates 12. Through the cooperation of the positioning grooves 13 and the positioning plates 12, the crawling tray 2 can be placed inside the base 101 along the positioning plate 12. A limiting rod 15 is provided on one side of the positioning plates 12. The crawling tray 2 cannot move down further when a lower surface of the crawling tray 2 is contacted with an upper surface of the limiting rod 15, so that the height of the crawling plate 2 is easily to be controlled. Water-weeping holes are opened in the crawling tray 2, so that water from the water delivery pipe 5 above can enter the bottom part 1a of the base 101 through the crawling tray 2.

The connecting part 102 is hollowed. The access opening 1011 on the housing 1 is located on the connecting part 102, which facilitates lizards to enter the housing 1 through the access opening 1011. Each of two side walls of the housing 1 is provided with a connecting block 14, an upper end of each of the positioning plates 12 on the base 101 is provided with a groove. Connecting blocks 14 on the connecting part 102 can be engaged in the grooves on the positioning plates 12, to realize the assembly of the connecting part 102 and the base 101. An upper end of the connecting part 102 is provided with a through groove.

A connecting bulge is provided on a lower end face of the top cover 103, the connecting bulge can be engaged in the through groove on the connecting part 102, to realize the assembly of the top cover 103 and the connecting part 102. The disassembly and assembly of the base 101, the connecting part 102 and the top cover 103 can be conveniently realized through the cooperation, which facilitates the cleaning of the inside of the housing 1, and improves the living quality of reptile pets such as the lizards.

Figure 6:
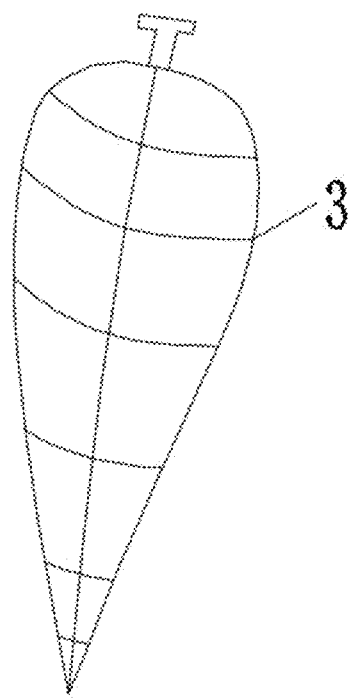
FIG. 6 is a schematic view of a water dripping member of the pet water feeder according to an embodiment of the present application.

As shown in FIG. 6, the water-dripping member 3 may be a simulated leaf. An upper end of the simulated leaf is provided with a clamping seat made of rubber or plastic and can be installed in a water-weeping hole 61 of the water-weeping tray 6 to be like a rainforest. The lizards or other reptile pets can drink the water flowing on the water-dripping member 3.

Firstly, a proper amount of drinking water is filled in the base 101, and then the water pump 4 is started. The water is lifted to above the water-weeping tray 6 through the water pipe 5. After the drinking water is fell on the water-weeping tray 6, the drinking water flows to the water-dripping member 3, that is, to an outer surface of the simulated leaf. Through the water-weeping hole 61, there is always drinking water on the outer surface of the simulated leaf. The crawling tray 2 is configured for supporting the lizards. The lizards drink the drinking water flowing on the simulated leaf. The drinking water flows downwards through the water-dripping member 3 and enters the base 101 through the crawling tray 2, which facilitates the water pump 4 to realize the circulating flow of the drinking water in the base 101. The drinking water is prevented from being smelly, the quality of the drinking water for the reptile pets is improved. The housing 1 has only one access opening and thus can give a relatively dark environment for the lizards to meet the security need of the lizards.

As shown in FIG. 4, An upper end 1b of the housing 1 is provided with a mounting groove 1013. A basket 7 is provided in the mounting groove 1013 and located above the water-weeping tray 6. A storage frame 8, which holds active carbon inside, is placed in the basket 7. The active carbon is clamped in the storage frame 8. After the water in the water delivery pipe 5 is transported to a higher place, the water is filtered through the active carbon. Only the water having been filtered by the active carbon can falls onto the water-weeping tray 6, and then be drunk by the lizards, the quality of the drinking water for the lizards is improved. When cleaning or replacement of the active carbon is needed, the storage frame 8, as well as the active carbon in the storage frame 8, are taken out through the basket 7. A surface of the mounting groove 1013 is provided with a baffle, and an upper end of the basket 7 is provided with an epitaxial plate. The basket 7 is prevented from dropping, through the mounting groove 1013, to the inside of housing 1, through the cooperation of the epitaxial plate and the baffle.

As shown in FIG. 4, a lateral part 71 of the basket 7 is provided with clamping grooves 9, and an outer surface 81 of the storage frame 8 is provided with suspension tongues 10 matched with the clamping grooves 9. An opening is provided at a lower end of the basket 7, the clamping grooves 9 are arranged on two side walls of the basket 7. The storage frame 8 can enter the basket 7 through the opening at the lower end of the basket 7, and meanwhile, the suspension tongues 10 can enter the clamping grooves 9 of the lateral part of the basket 7, so that the storage frame 8 is easily to be put in and take out.

Further, an upper surface 21 of the crawling tray 2 is provided with a filtering layer 23 made of sponge. The filtering layer 23 not only can filter out impurities and dusts of larger particles, but also can be used for supporting the reptile pets such as the lizards or the like, and providing a moist platform for the reptile pets.

Further, the water outlet 51 of the water delivery pipe 5 is provided with a flaring end cover 11. The flaring end cover 11 increases a sectional area of the water flow out of the water delivery pipe 5, so that the drinking water can flow out through the water-weeping tray 6 as evenly as possible. With the flaring end cover 11, when there are a plurality of lizards, the fighting for water among the lizards caused by uneven flowing of the drinking water can be reduced, furthermore, the flowing speed of the drinking water can be reduced, and the larger noise caused by the too high flowing speed of the drinking water can be prevented.

This kind of pet water feeder can provide an environment like a rainforest for the reptile pets such as the lizards, which is helpful for the better feeding of the lizards and the like. Furthermore, through the water pump 4, the circulating drinking water can be provided for the lizards, the water can be prevented from going bad and stinking resulted from long-time non-flowing. The drinking water is filtered through the active carbon and the filtering layer, the quality of the drinking water is improved, which is helpful for the long-term feeding of the reptile pets such as lizards.

Unless the statement and limitation are explicitly given in the description of the present utility, the terms "mounting," and "connection" should be construed broadly, and may be, for example, a fixed connection, a detachable connection, or an integral connection, and can be a mechanical connection or an electrical connection, and can be a direct connection or an indirect connection made through an intermediate medium, and can be a communication between two elements. The specific meaning of the above terms in the present application will be understood in specific cases by those of ordinary skill in the art.

It will be evident to those skilled in the art that the application is not limited to the details of the foregoing illustrative embodiments, and that the present application may be embodied in other specific forms without departing from the spirit or essential characteristics thereof. The present embodiments are, therefore, to be considered in all respects as illustrative and not restrictive. The scope of the application is defined by the claims rather than by the foregoing description, and all changes which come within the meaning and range of the equivalents of the claims are therefore intended to be included therein. Any reference sign in a claim should not be construed as limiting the claim.

Furthermore, it should be understood that although the present disclosure is described by embodiments, not every embodiment is provided with only one separate solution. This description is provided for clarity only, the disclosure should be taken as a whole, and other embodiments can be apparent to those skilled in the art by appropriately combining embodiments which are described as examples in the disclosure.

What is claimed is:

1. A pet water feeder comprising:
   a housing having an access opening and a bottom part for storing water;
   a crawling tray arranged in the housing and capable of draining water off;
   a water-weeping tray arranged in the housing and above the crawling tray, wherein the water-weeping tray has a water-weeping hole;

a water-dripping member installed in the water-weeping hole;

a water pump located at the bottom part of the housing and comprising a water inlet and a water outlet, wherein the water inlet is located at the bottom part of the housing, and the water outlet is connected with a water delivery pipe; and the water delivery pipe comprising a water outlet located above the water-weeping tray, wherein an upper end of the housing is provided with a mounting groove accommodating a basket, the basket is located above the water-weeping tray, a storage frame is placed in the basket for accommodating active carbon.

2. The pet water feeder of claim 1, wherein a lateral part of the basket is provided with clamping grooves, and an outer surface of the storage frame is provided with suspension tongues matched with the clamping grooves.

3. The pet water feeder of claim 1, wherein an upper surface of the crawling tray is provided with a filtering layer.

4. The pet water feeder of claim 1, wherein a water outlet of the water delivery pipe is provided with a flaring end cover.

* * * * *